(No Model.)
G. EDMONDS.
ADJUSTABLE NUT BEARING.
No. 298,563. Patented May 13, 1884.
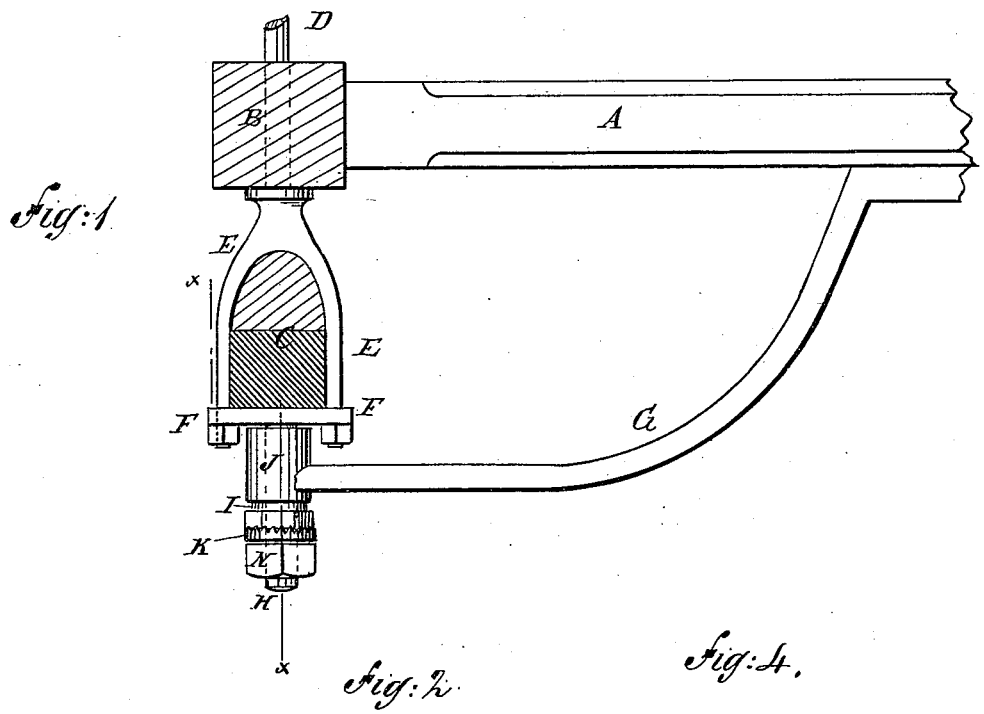
Fig: 1.
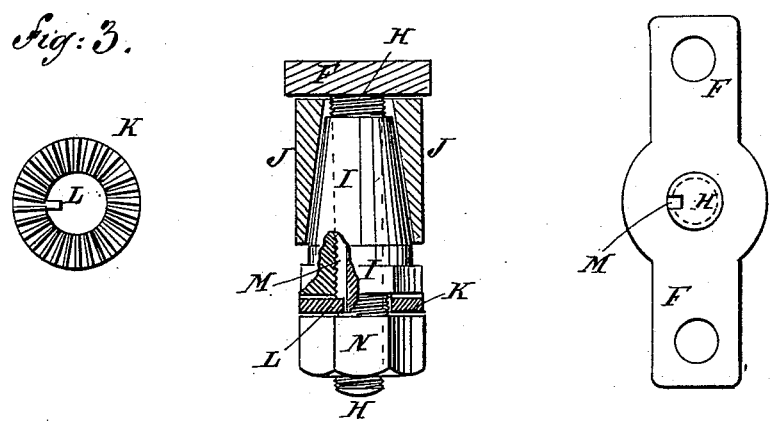
Fig: 3.  Fig: 2.  Fig: 4.
WITNESSES:
Chas. Nida
C. Sedgwick
INVENTOR:
G. Edmonds
BY Munn & Co.
ATTORNEYS.

UNITED STATES PATENT OFFICE.

GEORGE EDMONDS, OF BROOKLYN, ASSIGNOR TO HIMSELF AND WILLIAM J. McGINN, OF NEW YORK, N. Y.

ADJUSTABLE NUT-BEARING.

SPECIFICATION forming part of Letters Patent No. 298,563, dated May 13, 1884.

Application filed September 4, 1883. (No model.)

*To all whom it may concern:*

Be it known that I, GEORGE EDMONDS, of Brooklyn, in the county of Kings and State of New York, have invented a new and useful Improvement in Adjustable Nut-Bearings, of which the following is a full, clear, and exact description.

Reference is to be had to the accompanying drawings, forming a part of this specification, in which similar letters of reference indicate corresponding parts in all the figures.

Figure 1 is a side elevation of my improvement shown as applied to a drop-stay coupling. Fig. 2 is a sectional front elevation of the same, taken through the line $x\ x$, Fig. 1. Fig. 3 is a face view of the jam-washer. Fig. 4 is an under side view of the bolt and yoke.

The object of this invention is to provide nut-bearings constructed in such a manner that the wear can be readily taken up and all rattling prevented.

The invention consists in a nut-bearing constructed with a bolt having side groove, a tapered nut screwed upon the bolt fitting into a tapered socket and held from turning by a washer having a roughened face, and a tongue projecting inward to enter the side groove of the bolt to hold the said washer from turning, the said washer being pressed against the end of the tapered nut by a jam-nut, to hold the said nut from turning off, as will be hereinafter fully described.

I will describe my improvement as applied to a drop-stay coupling, but do not limit myself to that application, as it can be used with equal advantage in various other places, such as king-bolts, top-props, axles, cocks, faucets, hinges, bolts that turn in holes, and other similar connections.

A represents the reach; B, the head-block; C, the axle; D, the king-bolt; E, the king-bolt clip; F, the yoke, and G the drop-stay.

Upon the yoke F is formed a screw-bolt, H, upon which is screwed a nut, I. The outer surface of the nut I is tapered or made conical to fit into a tapered or conical hole or socket, J, in the end of the drop-stay G, and form a bearing for the said drop-stay. The outer or larger end is made of octagonal or other polygonal shape, so that it can be readily grasped and turned with a wrench. With this construction, as the friction-surfaces wear, the wear can be readily taken up by turning the tapered nut I forward.

Upon the outer part of the bolt H is placed a washer, K, which is made with an inwardly-projecting tongue, L, to enter a groove, M, in the side of said bolt H and prevent the said washer from turning. The inner side or face of the washer K, that rests against the end of the nut I, is corrugated or roughened, so that when pressed against the said nut it will hold the said nut from turning off. The washer K is pressed against the end of the nut I by a jam-nut, N, screwed upon the end of the bolt H. A special advantage of this construction is that it prevents the more expensive parts of the bearings from wearing out, and thus makes the said bearings more durable and safe.

Having thus described my invention, I claim as new and desire to secure by Letters Patent—

The combination of the yoke F, having the downwardly-extended screw-bolt H, the externally-tapered nut I, and the drop-stay G, having the conical socket J, as and for the purpose described.

GEORGE EDMONDS.

Witnesses:
FRANCIS J. BRIGGS,
MICHAEL J. AHERN.